(12) United States Patent
Chambe et al.

(10) Patent No.: US 6,244,199 B1
(45) Date of Patent: Jun. 12, 2001

(54) PLANT FOR THERMOLYSIS AND ENERGETIC UPGRADING OF WASTE PRODUCTS

(75) Inventors: Eric Chambe; Maurice Chambe, both of Bessenay; Pascal Haxaire, Le Bourg, all of (FR)

(73) Assignee: Traidec S.A., Bessenay (FR)

( * ) Notice: Subject to any disclaimer, the term of this patent is extended or adjusted under 35 U.S.C. 154(b) by 0 days.

(21) Appl. No.: 09/269,448

(22) PCT Filed: Oct. 21, 1997

(86) PCT No.: PCT/FR97/01886

§ 371 Date: Mar. 26, 1999

§ 102(e) Date: Mar. 26, 1999

(87) PCT Pub. No.: WO98/17950

PCT Pub. Date: Apr. 30, 1998

(30) Foreign Application Priority Data

Oct. 22, 1996 (FR) .................................................. 96 13090
Apr. 25, 1997 (FR) .................................................. 97 05426

(51) Int. Cl.⁷ ............................... F23B 7/00; C10B 51/00
(52) U.S. Cl. ..................... 110/346; 110/234; 110/218; 110/219; 110/224; 110/342; 110/345; 201/13; 202/113; 421/189
(58) Field of Search .................... 110/233, 234, 110/218, 219, 224, 229, 342, 345, 346, 235; 201/13, 14, 15, 16; 202/113; 422/189

(56) References Cited

U.S. PATENT DOCUMENTS

| 4,077,868 | | 3/1978 | Chambers . | |
| 4,291,539 | * | 9/1981 | Potter ...................................... | 60/670 |
| 4,344,373 | * | 8/1982 | Ishii et al. ............................. | 110/347 |
| 4,774,895 | * | 10/1988 | Christmann ........................... | 110/234 |
| 4,839,021 | | 6/1989 | Roy . | |
| 4,878,440 | | 11/1989 | Tratz et al. . | |
| 5,231,936 | * | 8/1993 | Kikuchi et al. ....................... | 110/224 |
| 5,378,323 | * | 1/1995 | Fransham et al. ........................ | 201/8 |
| 5,505,144 | | 4/1996 | Doron et al. . | |
| 5,728,196 | * | 3/1998 | Martin et al. ........................... | 75/403 |
| 5,857,421 | * | 1/1999 | Doron et al. ........................... | 110/346 |
| 6,018,090 | * | 1/2000 | Schmidt ................................. | 588/205 |
| 6,101,959 | * | 9/2000 | Bronicki et al. ...................... | 110/347 |

FOREIGN PATENT DOCUMENTS

| 1 163 595 | 3/1984 | (CA) . |
| 195 33 605 A1 | 3/1997 | (DE) . |
| 692677A1 | 1/1996 | (EP) . |
| 694737A1 | 1/1996 | (EP) . |
| 2715087 | 7/1995 | (FR) . |
| 1562492 | 3/1980 | (GB) . |
| 96/11742 | 4/1996 | (WO) . |

\* cited by examiner

Primary Examiner—Denise L. Ferensic
Assistant Examiner—K. B. Rinehart
(74) Attorney, Agent, or Firm—Wall Marjama & Bilinski

(57) ABSTRACT

The invention concerns a plant for the thermolysis of waste products containing an organic fraction, and for simultaneous energetically upgrading these waste products comprising: a unit for loading and supplying the waste products to be treated; a thermolysis reactor for thermal dissociation under reduced pressure at high temperature. The invention is characterized in that it comprises: upstream and downstream of the reactor, a lock chamber for maintaining a partial vacuum in the reactor for ensuring thermolysis in an atmosphere with low oxygen content; first means for recuperating, in the upper part of the reactor, the organic gas fraction formed during thermolysis, and for bringing this fraction to a combustion chamber supplying a steam generator; second means for recuperating at the bottom of the reactor the solid carbon products formed during thermolysis, and for bringing these solid products to a combustion chamber supplying a steam generator or an evacuating system. The gas of the combustion chamber and the steam produced by the steam generator, in turn supply the unit producing the waste products and/or means for drying in advance of the waste products provided just upstream of the reactor.

6 Claims, 6 Drawing Sheets

PLANT FOR THERMOLYSIS AND ENERGETIC UPGRADING OF WASTE PRODUCTS

TECHNICAL FIELD

The invention relates to a plant for the treatment by thermolysis and simultaneously for the upgrading with regard to energy of waste comprising an organic fraction.

PRIOR ART

The treatment of waste comprising an organic fraction is well known, in particular in the treatment of waste as diverse as automobile shredder residues (ASR), hospital waste, also known as healthcare activity waste, old tyres, green waste or waste resulting from biomasses, municipal and domestic waste, or meat meal, but also treatment plant sludges and the sludges from various petroleum products. The treatment of waste of these types is becoming increasingly worrying as a result of the increasingly large amounts to be treated and of the increase in the cost of these treatments.

The thermal dissociation of waste comprising an organic fraction under reduced pressure and at high material temperature is well known (see in particular document U.S. Pat. No. 4,077,868, U.S. Pat. No. 4,833,021 and CA-A-1,163, 595).

In essence, a plant for the thermal dissociation at reduced pressure of waste comprising an organic fraction essentially comprises:
- a unit for loading and for introducing the waste to be treated;
- and a reactor for thermal dissociation under reduced pressure and at high temperature, for example at a temperature of between 400 and 1000° C., in particular in the region of 500° C., under a pressure of between 0.1 and 1 atmosphere.

In the document WO-96/11742, the Applicant Company described a plant of the type in question in which two chambers, placed in parallel, are positioned between the introduction means and the reactor, each of these chambers being connected to the introduction means of the reactor, thus allowing one of the two chambers to be loaded at atmospheric pressure while the other is being discharged at reduced pressure into the reactor. This batchwise/continuous plant, well suited to the treatment of large amounts, exhibits the disadvantage, however, of requiring significant investment.

Furthermore, the production of oils by condensation during the treatment is, on a practical level, difficult to manage industrially.

In addition, and as said above, the destruction of meat meal unfit for animal consumption is becoming worrying, in particular with the risk of the presence of prions in this meal, so that several techniques have been provided to date for the incineration of meal.

The first technique consists in mixing this meal with municipal waste and in then pyrolysing the combined mixture in municipal incinerators, which are known to be already overloaded. Furthermore, the small particle size of this meal leads to the risk of it being swept away into the air, interfering with the operation of the incinerators. This technique is so expensive that it has not experienced any development.

Provision has also been made to incinerate this meal in inclined rotary kilns. Here again, the small particle size of this meal leads to the risk of it being swept away into the air and the flow in the kilns is often not very good. Finally, the flue gases produced have to be treated with special equipment which places a crippling burden on the cost of the plant.

The invention overcomes these disadvantages. It is targeted at a plant for the treatment by thermolysis of waste and for the upgrading with regard to energy of this waste which is well suited to the treatment of waste of the most varied kinds, in small and medium volumes, with a good ratio between investment and operation. It is more particularly targeted at a plant of the type in question which is reliable and robust and which has operating conditions which scrupulously respect the environment.

Another object of the invention is to provide a plant which can carry out a complete treatment of the thermolysis by-products until the final waste is obtained, that is to say waste which cannot be upgraded under current economic conditions.

The invention is targeted at a plant of the type in question in which the energy produced during the treatment is recovered in order to operate, in part and autonomously, the plant itself and part of the unit which can produce this waste.

SUMMARY OF THE INVENTION

The invention relates to a plant for the treatment by thermolysis of waste comprising an organic fraction and simultaneously for the upgrading with regard to energy of this waste of the type essentially comprising:
- a unit for loading and for introducing the waste to be treated;
- a reactor for thermal dissociation thermolysis under reduced pressure at high temperature, characterized
in that it comprises:
- upstream and downstream of the reactor, an isolation means intended to maintain a partial vacuum in the reactor in order to ensure thermolysis in an atmosphere with a very low oxygen content;
- first means for recovering, in the upper part of the reactor, the gaseous organic fraction formed during the thermolysis and for introducing this gaseous fraction into a combustion chamber feeding a steam generator;
- second means for recovering, at the bottom of the reactor, the solid carbonaceous products formed during the thermolysis and for introducing these solid products into a combustion chamber feeding a steam generator or a discharge system;

and in that the gases from the combustion chamber and the steam produced by the steam generator in their turn feed the unit in which the waste is produced and/or a means for predrying the waste positioned immediately upstream of the reactor.

In other words, the invention consists in heating the waste exhibiting a controlled particle size under conditions suitable for dissociating this waste essentially into two phases, respectively a gas phase and a solid phase, this being carried out in the virtual absence of oxygen but under reduced pressure, indeed even under a gaseous atmosphere.

The invention consists in recovering the gas phase and the solid phase in order to upgrade them by producing energy in a combustion chamber intended to heat steam which in its turn feeds the unit in which waste is produced and/or is targeted at predrying the waste before it arrives at the reactor.

In practice, the thermolysis, also denoted under the term of "pyrolysis", is carried out at a temperature of between 400 and 1000° C., in particular in the region of 500° C., with a pressure in the reactor of 5000 to 40,000, preferably 10,000, pascals below atmospheric pressure. The residence time of the waste in this reactor is of the order of several tens of minutes, for example of the order of thirty minutes.

As already said, depending on the nature of the waste to be treated, the latter is advantageously premilled in order to exhibit a controlled, indeed even homogeneous, particle size and physical consistency.

In practice, a particle size is defined of between 1 and 10 centimetres, these limits being in no way limiting.

Likewise, the waste can advantageously be subjected to a predrying intended to lower the water content in this waste. This heating, carried out in an appropriate chamber, can, depending on the nature of the waste to be treated, be carried out in two ways, namely directly or indirectly. In the direct drying, the mass of the waste is heated by circulation of hot air or of steam recycled from the generator characteristic of the invention or of hot air recycled from the combustion chamber. This method of predrying is particularly appropriate for waste with a low volatile solid fraction (dust), such as ASR. When treatment plant sludges are treated, it is preferable to carry out indirect heating, that is to say to heat the chamber externally, while providing a degree of mixing intended to break up the product in order to increase the contact surface with the air.

In an advantageous embodiment, a means for adding an agent for the neutralization of the aggressive components, such as, for example, halogens or sulphur, which makes it possible to avoid the subsequent presence of harmful compounds ($SO_2$, HCl, HF) in atmospheric discharges, is positioned in the path of the waste between the introduction device and the reactor. This neutralization agent, such as, for example, calcium carbonate, is incorporated in the milled waste as it is conveyed between the introduction device and the thermolysis reactor. This milling of the waste allows better distribution of the neutralizing agent and consequently better effectiveness of this neutralization.

The thermolysis reactor, preceded by the isolation means characteristic of the invention, operates in the absence of oxygen at a temperature, as already said, of between 400 and 1000° C., preferably in the region of 500° C., and the pressure in the reactor is maintained from 5000 to 40,000, preferably 10,000, pascals below atmospheric pressure. It follows that the waste to be treated, which generally progresses forward as thin layers, then decomposes under the effect of the heat into two by-products, respectively a gas, for substantially two-thirds, and a solid carbonaceous residue, for substantially a third. The residence and flow time in the reactor is several tens of minutes, in particular thirty minutes. The reactor is heated by appropriate means, such as electricity, in particular.

According to the invention, the two by-products from the thermolysis, respectively the gas and the solid carbonaceous residue, are recovered, the first at the top of the reactor and the second at the bottom of the latter.

According to another characteristic of the invention, the plant comprises at least one isolation means positioned upstream and downstream of the reactor. This isolation means can be formed in any known way, for example by a helical compression screw, by pumps, by guillotine valves or the like.

According to another characteristic of the invention, the thermolysis gases recovered at the top of the reactor are conveyed under the effect of suction to a combustion chamber which in its turn feeds a steam generator. It is important for the gaseous thermolysis fraction to be maintained at high temperature during the transfer from the reactor to the combustion chamber. At the same time, the solid carbonaceous products recovered at the bottom of the reactor are conveyed to another combustion chamber in order to be incinerated therein, this second chamber also in its turn feeding another steam generator, or, failing this, a discharge system for the purpose of a final upgrading, indeed even disposal on a landfill site.

More specifically, when the starting material comprises a pollutant, the treatment by thermolysis makes it possible to concentrate the pollutant in one of the two by-products, generally the solid by-product, and thus to carry out the treatment of the flue gases on only a portion of the products and not on all the products, which is reflected by an appreciable saving.

The solid carbonaceous product obtained after thermolysis can advantageously be separated into two by-products, a non-combustible product and a combustible product, only the said combustible product being conveyed into the combustion chamber, the noncombustible product being upgraded.

Thus, in the case of the treatment of automobile shredder residues, the non-combustible metal is separated from the combustible fraction, which makes it possible to improve the output and the efficiency of the plant.

In a simplified embodiment, the thermolysis gases and the solid carbonaceous residues produced by the reactor are conveyed to the same combustion chamber which feeds one and the same steam generator. In and alternative form, the combustion chamber comprises two furnaces, respectively a first furnace for the solid carbonaceous products and a second for the gases.

This separate combustion of the two by-products, gaseous and solid respectively, makes it possible to optimize the quality of the combustion and consequently the outputs. The hot combustion gases are subsequently combined in order to be upgraded in the form of energy for the production of steam or of hot water.

As already said, before combining the hot combustion gases, it is possible, after having separated the polluting solid by-product, to treat the flue gas resulting from the combustion of this by-product in a unit for the treatment of flue gases, which unit is intended to recover the pollutants in order for them to be disposed of on a landfill site for final waste.

Thus, it could be determined that the treatment of 200 kilos per hour of hospital waste makes it possible to produce approximately 600 kilos per hour of steam at 8 bar.

After having been upgraded, the combustion gases are discharged to the atmosphere via a conventional chimney under conditions which prevent the formation of a plume.

On the other hand, the solid carbonaceous products, after having been upgraded in the combustion chamber, result in markedly lower amounts of final waste, such as ash, than those of the clinker resulting from conventional incineration, in particular when, before combustion, the non-combustible metallic fraction and the combustible fraction are separated.

MANNER OF IMPLEMENTING THE INVENTION

Figure 1:
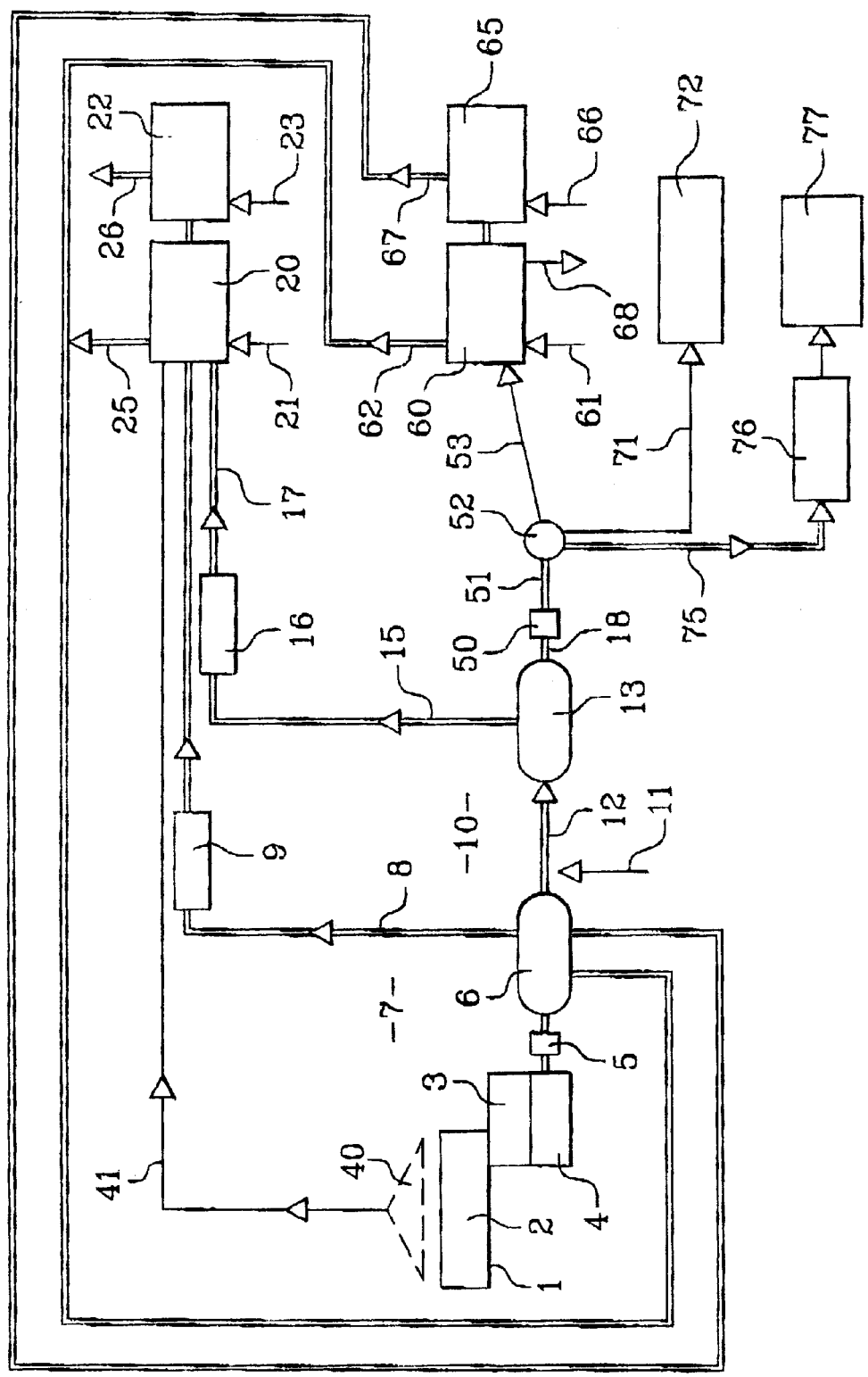
FIG. 1 diagrammatically illustrates a plant in accordance with the invention.
Figure 2:
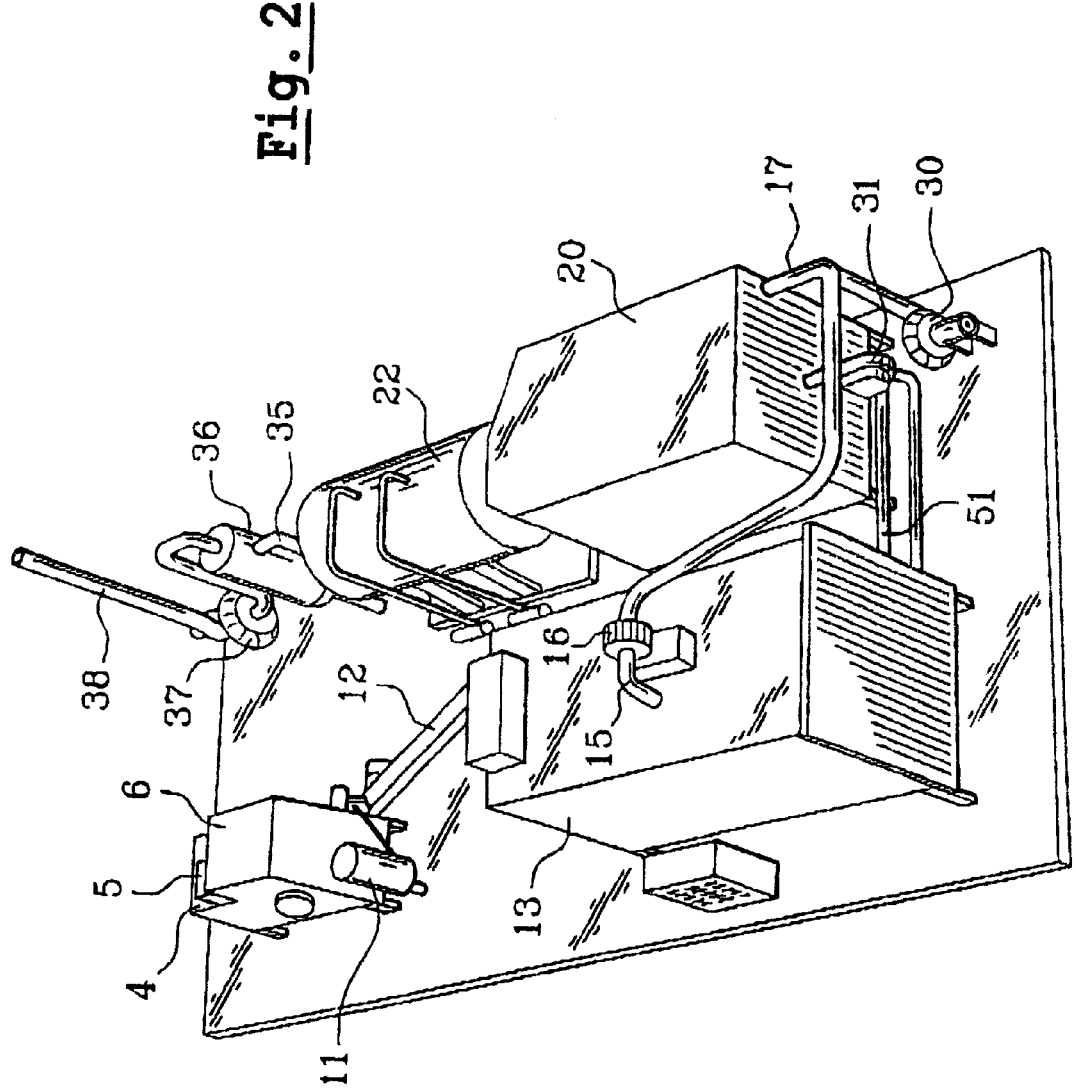
FIGS. 2 and 3 show this same plant in outline perspective view, respectively three-quarter top view (FIG. 2) and three-quarter side view (FIG. 3).
Figure 3:
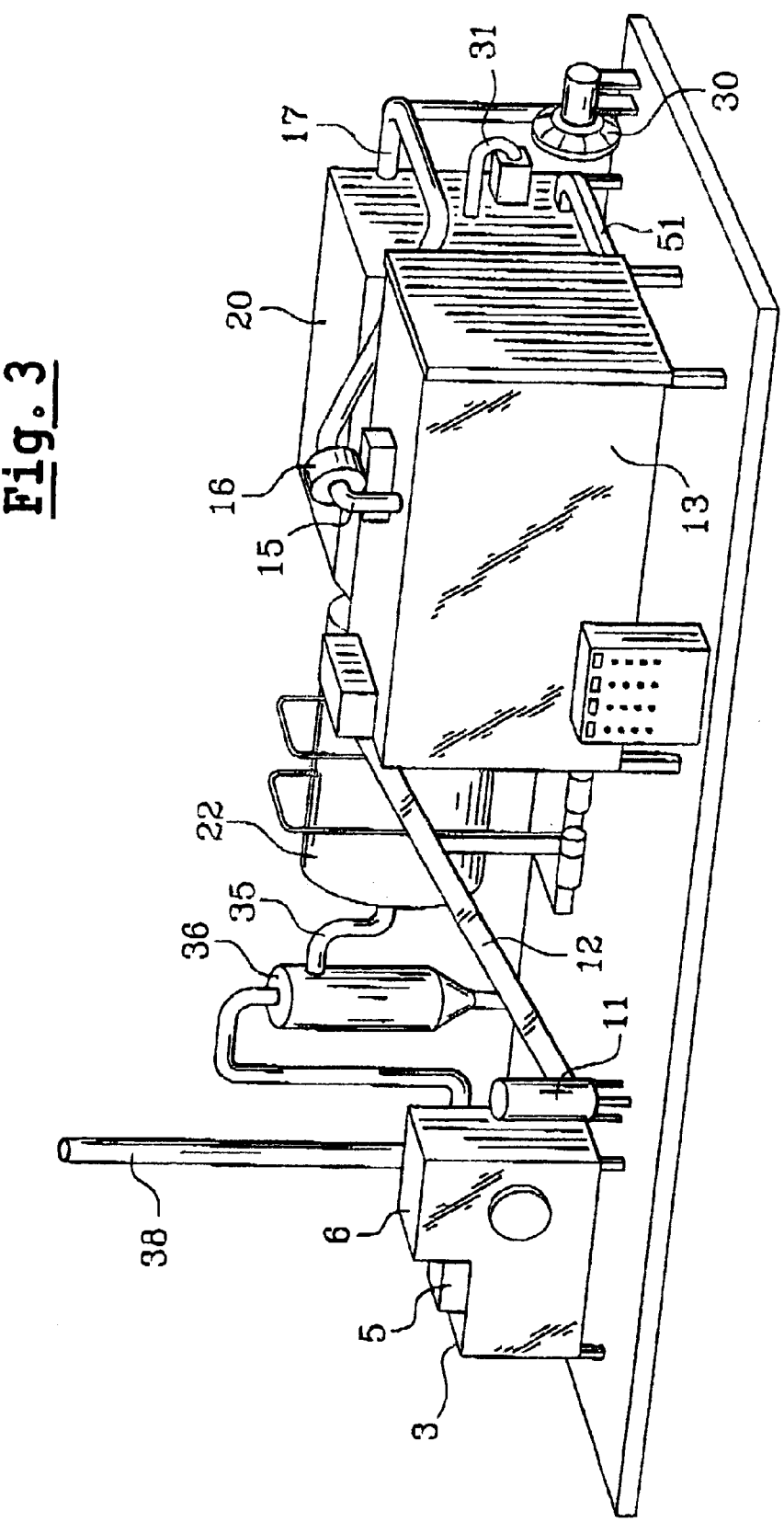

With reference to FIGS. 1 to 3, the plant in accordance with the invention comprises a receiving station (1) for the waste (2) to be treated comprising an organic fraction, such as hospital waste, old tyres, automobile shredder residues (ASR), green waste or biomass waste, municipal or domestic waste, treatment plant sludges, or indeed even petroleum waste.

This waste (2) is introduced into a milling unit (3) intended to bring it to a controlled particle size, preferably a homogeneous particle size. The milled waste is subsequently introduced into a hopper (4), then into an isolation means (5), and from there into a directly or indirectly heated drying chamber (6). The vapours (7) resulting from the drying are captured at the top of the chamber (6) via a pipeline (8) in order to be introduced into the combustion chamber. The dried waste (10) first of all has a neutralizing agent, such as calcium carbonate, added to it in (11) and is then subsequently conveyed via a conveyor (12) to the inlet of the reactor (13).

In an alternative form, the waste (2) is stored in an intermediate storage silo upstream of the reactor (13) and is directly conveyed to the latter, without prior milling and drying stages.

Figure 6:
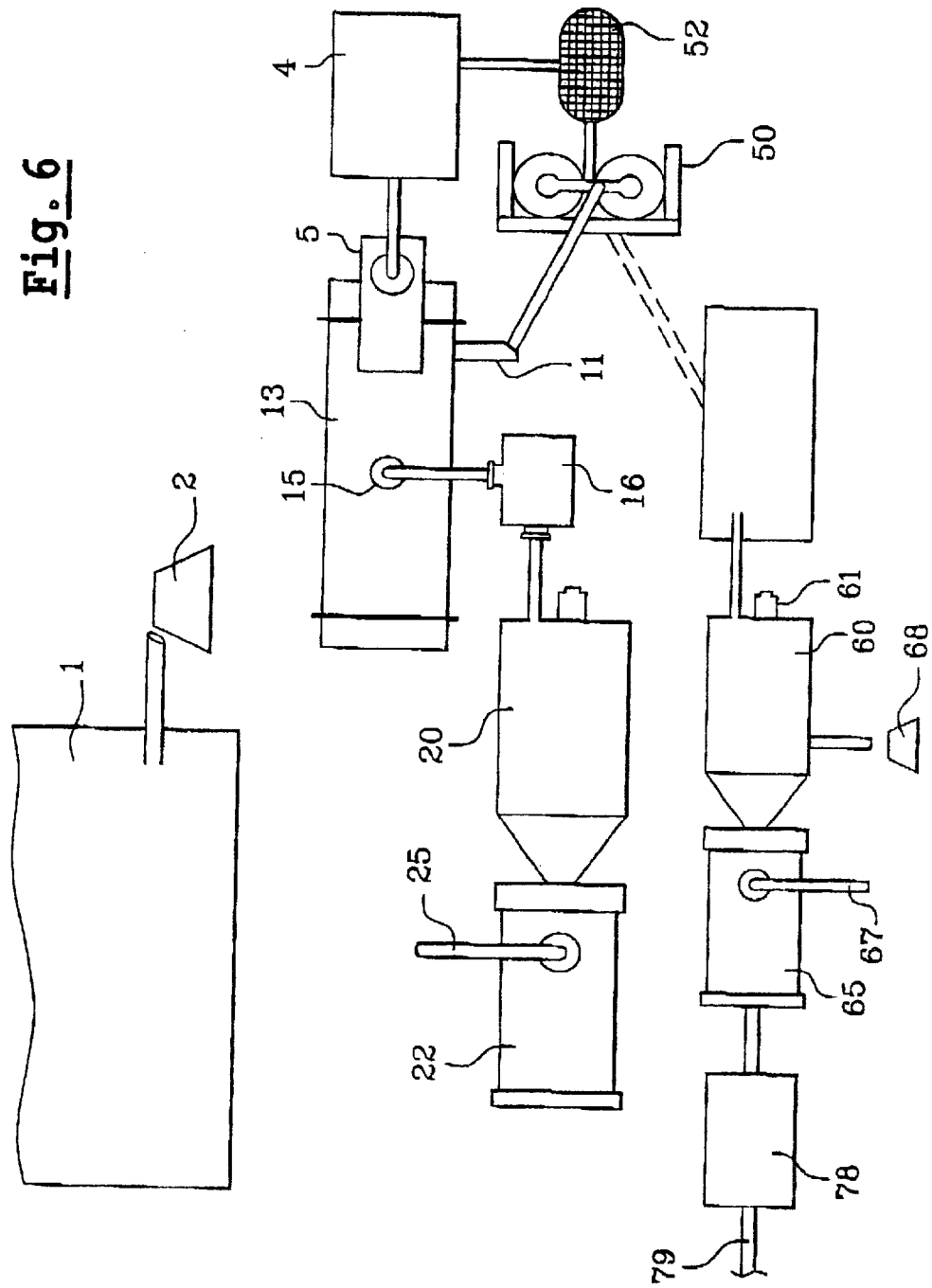
FIG. 6 is a representation of the plant of the invention applied to the treatment of meat meal.

This thermolysis reactor (13) can be of the type pf that which is disclosed in the document WO-96/11742 of the Applicant Company, in particular in FIGS. 6, 9 and 10 of this document, or of another equivalent known type. This reactor (13) is preferably heated with electricity. It is important for this reactor (13), heated at a temperature in the region of 500° C. with a partial vacuum of the order of ten thousand (10,000) pascals below atmospheric pressure, to operate with a deficiency of oxygen. The residence time of the waste (10) in this reactor is approximately thirty minutes.

To avoid any ignition of the carbon present in the waste on contact with oxygen which might be accidentally introduced into the reactor, provision is made for the installation of a supply of nitrogen at the reactor.

The thermolysis brings about the formation of two by-products, respectively a gaseous organic fraction recovered upwards via the pipeline (15) and a fraction of solid carbonaceous products recovered downwards (18).

According to one characteristic of the invention, the plant comprises means (15) for recovering at the top of the reactor (13), in particular using a pipeline and a fan (16), the gaseous organic fraction formed during the thermolysis in order to introduce it into a combustion chamber (20). This combustion chamber, of horizontal cylindrical type, has an inlet (21) for propane gas which makes it possible to supply an extra charge, to guarantee that the temperature is maintained during the start-up and shutdown phases and to provide a pilot light. This combustion chamber (20) in its turn feeds the steam generator (22), for example of the double-circulation boiler type fed with water (23).

In an advantageous embodiment, the clean combustion gases from the combustion chamber (20) are introduced via a pipe (25) into the dryer (6), in particular to provide direct drying of the waste to be treated. The steam produced by the generator (22) is introduced via a pipe (26) into the same dryer (6), in order to provide indirect drying of the waste to be treated, or in order to be used at the site on which the waste (2) is produced.

The reference (30) denotes a fan for introducing combustion air and the reference (31) the burner of the combustion chamber (20). In the same way, the pipe (8) for extraction of the vapours from the dryer (6) is used in combination with an extraction fan (9) which introduces these vapours into the same combustion chamber (20).

The flue gases emerging from the generator (22) are introduced via the pipe (35) into a cyclone (36), from where they are extracted by a fan (37) connected to the external chimney (38) for discharge to the atmosphere.

In an advantageous alternative form, the receiving area (1) for the waste (2) is surmounted by a hood (40) used in combination with a pipe (41) introducing low pressure air into the combustion chamber (20) in order to act as additional combustion air. In this way, by virtue of a fan which is not represented, the vapours naturally given off by waste, in particular hospital waste, are discharged and then incinerated and do not disperse in the treatment chamber.

According to another characteristic of the invention, the solid carbonaceous residues (18) formed during the thermolysis first of all pass through an isolation means (50) analogous to (5) and then onto a conveyor (51) which makes it possible to extract these residues at the bottom of the reactor (13).

The solid carbonaceous residues (18) are advantageously cooled indirectly before or after the isolation means (50), so as to avoid any risk of explosion.

In addition, for large plants, the isolation means (50) can be composed of two parallel silos filled under reduced pressure and alternately emptied at atmospheric pressure.

These solid carbonaceous residues (18) are rich in carbon but also in pollutants, such as chlorine or sulphur, and comprise inorganic fractions, such as metal, glass, pebbles, indeed even multiple residues. These residues, which are embedded in the very fine pulverulent powder resulting from the thermolysis of the organic fraction, are screened in (52) according to their particle size and their nature, making it possible to obtain a carbonaceous fraction (53) and an inorganic fraction (71, 75).

The carbonaceous fraction (53) is introduced into a second combustion chamber (60), analogous to (20), which is also fed with propane gas (61) and the outlet of which for gases (62), analogous to (25), can be connected to the dryer (6). This combustion chamber is, as above, used in combination with a steam generator (65) fed with water (66) in order to provide steam in (67), analogous to (26), in order also to be connected to the dryer (6). The combustion ash is removed in (68) in order to be disposed of on a landfill site.

The inorganic fraction (71, 75), essentially comprising metals, glass, pebbles or final waste, forms the subject of an additional screening in order to store (72) and then recover the recyclable materials (71), on the one hand, and the non-upgradable fraction (75) composed of solid residues, on the other hand, which are discharged (76) in order to be disposed of on a landfill site (77).

According to an advantageous embodiment, the screening carried out in (52) consists in separating the ferrous metals from the carbonaceous fraction (53) obtained after thermolysis, by magnetic separation, and at the same time separating the non-ferrous metals from the said carbonaceous fraction, by induction separation.

The ferrous metals obtained are subsequently upgraded, while the non-ferrous metals are subjected to another screening, making it possible to separate the inorganic part, on the one hand, and thus to obtain a carbonaceous powder, on the other hand, which powder is subsequently conveyed to the combustion chamber.

The steam streams (26, 67) produced by the generators (22, 65) are used either in (6) for drying the waste (2) to be treated in treatment unit (78) for cleaning the flue gases and/or for feeding energy to the unit in which this waste is produced.

In this way, the plant discharges to the external environment in (38) only clean flue gases (79) and final waste (77) or ash (68) which can be upgraded, since all the energy produced is converted into steam in order to be reinjected into the plant or in order to be upgraded upstream.

The gaseous fractions (7) introduced into the first combustion chamber (20) are incinerated at a temperature in the region of 850° C. for approximately two seconds. As already said, it is important for the gaseous fraction (7) to be conveyed at temperature, in particular by heating the pipeline or injection of a small amount of oxygen in order to incinerate a portion of the gases. The thermal destruction is then complete, which makes it possible to optimize the upgrading of the energy content of the waste in the form of steam (26, 27).

The plant according to the invention therefore makes it possible to treat with success waste of the most varied types comprising an organic fraction. In addition, and above all, it makes possible an upgrading with regard to energy of this thermolysis treatment by allowing the recovery in two phases, respectively a gas phase (15) and a solid phase (18), and the combustion of these two phases (20, 60) makes possible the production of steam (26, 67) (or hot water) intended to feed the dryer (6) and/or the unit in which the waste (2) is produced. Thus, during operation, the plant is virtually autonomous in terms of energy, which makes it highly attractive in terms of investment and operation.

Figure 4:
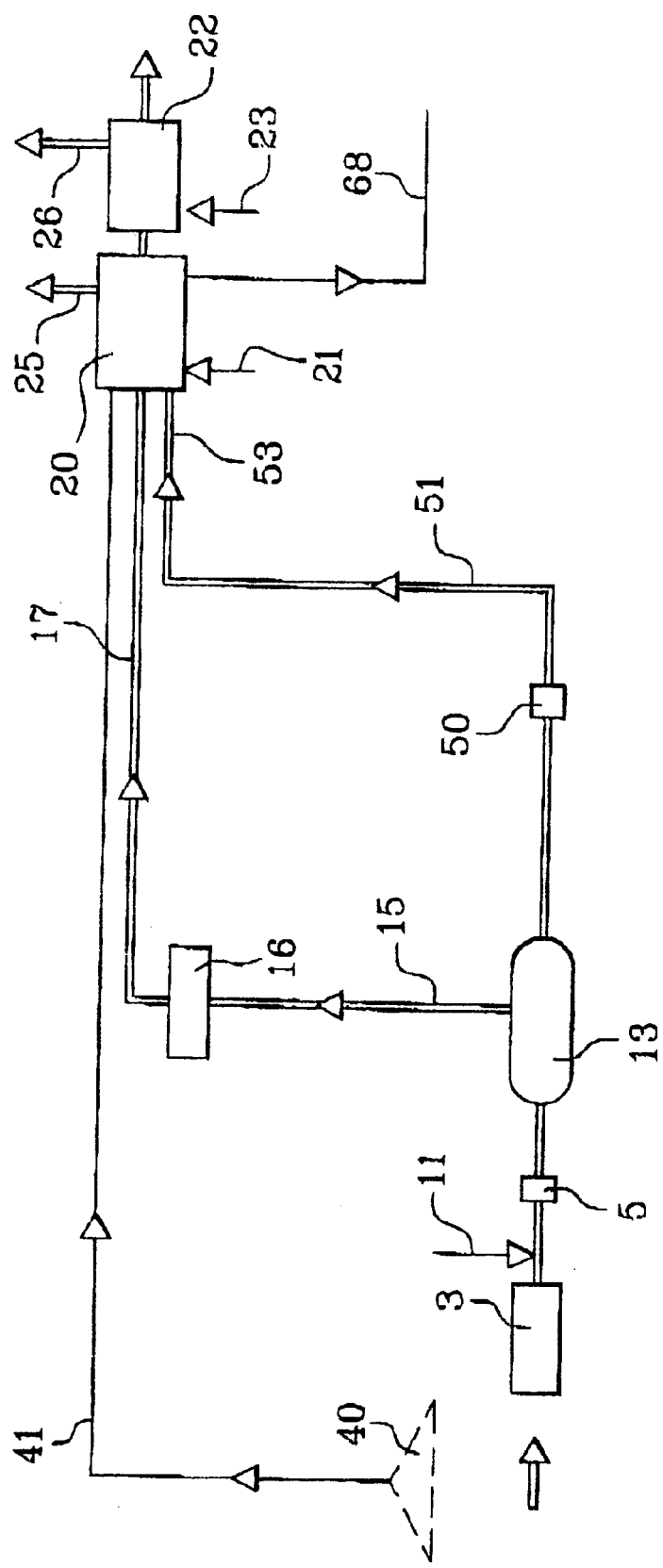
FIG. 4 is an outline diagrammatic representation of a first simplified plant in accordance with the invention.

FIG. 4 illustrates another simplified embodiment of the invention. For convenience, the same references have been used as in FIG. 1. In this plant, as the waste to be treated exhibits an acceptable level of moisture, there is no dryer (6), all the more so since the low capacity (200 kg/h) does not justify heavy investment (specific combustion chamber+dryer).

In this simplified version, in addition to the absence of the dryer (6), there is only one combustion chamber (20). However, it has a twin furnace, respectively a first furnace for treating the thermolysis vapours introduced via the pipe (17) and a second furnace for treating the carbonaceous residues (53) introduced via the conveyor (51). This simplified embodiment is advantageous in the treatment of low capacity hospital waste, for example between 100 and 300 kg/h.

Figure 5:
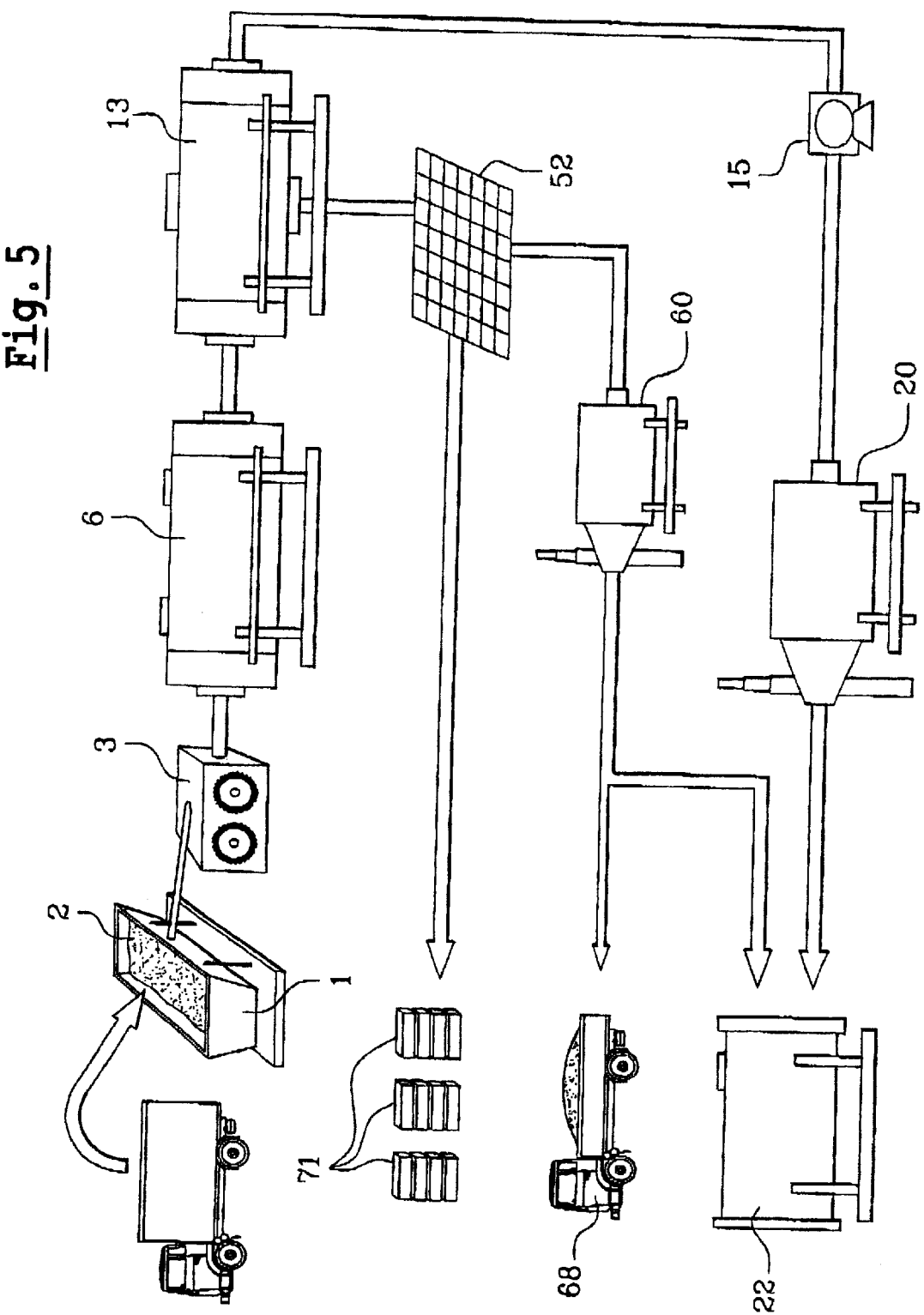
FIG. 5 is a diagrammatic representation of a second plant of the invention.

FIG. 5 illustrates a second simplified embodiment of the invention. For convenience, the same references have been used as in FIG. 1.

In this plant, the waste to be treated is conveyed into a milling unit and is then subsequently dried before being subjected to the thermolysis operation in the reactor. The gaseous organic fraction obtained is introduced into a combustion chamber, which chamber feeds a single steam generator.

At the same time, the solid carbonaceous products obtained after thermolysis are screened, making it possible to separate the ferrous metals by magnetic separation and the non-ferrous metals by magnetic induction, in order to retain only the carbonaceous fraction of the solid by-product. This carbonaceous fraction is subsequently conveyed to the combustion chamber, which chamber, on the one hand, produces ash and, on the other hand, feeds the single steam generator.

This simplified embodiment is particularly advantageous in so far as it makes it possible separately to upgrade the metallic and non-metallic fractions of the solid product obtained after thermolysis.

The plant of the invention, applied to the treatment of meat meal, has been represented in FIG. 6. The same references have been used in this diagram as in the other figures.

This plant comprises a unit for the production of meat meal, symbolized by the reference (1). This unit produces dry meal (2) which is intended for estruction as it is unfit for animal consumption. This meal (2) is introduced into a hopper (4), where it flows under gravity into an isolation means (5), for example a helical compression screw. This isolation means (5) is connected to a thermolysis reactor (13) of the type of that described above.

The reactor (13) is heated at a temperature in the region of 500° C. with a partial vacuum of the order of ten thousand (10,000) pascals below atmospheric pressure and the residence time of the meal in this reactor (13) is approximately thirty minutes. The thermolysis brings about the formation of two products, respectively a gaseous organic fraction recovered upwards via the pipeline (15) and a fraction of solid carbonaceous residues recovered downwards (18).

The gaseous organic fraction formed during the thermolysis is introduced via the pipeline (15) into a fan (16) connected in its turn to a first combustion chamber (20), for example of the horizontal cylindrical type. This chamber (20) in its turn feeds a first steam generator (22), for example of the "double circulation boiler"type, connected via a pipe (25) to the unit (1) for the production of meal.

Furthermore, the solid carbonaceous residues (18) formed during the thermolysis are recovered via a pipe (11), such as an endless screw positioned at the bottom of the reactor (13), in order to introduce these residues into a storage region (50) formed of two tanks, one being loaded at reduced pressure and the other bringing the residues to atmospheric pressure, these operations being carried out alternately.

The solid carbonaceous residues obtained are rich in carbon but also in pollutants, such as chlorine, sulphur or phosphorus.

These residues exist in the form of a very fine pulverulent powder which is sieved in (52), for example by passing through screens which make it possible to reject all the residues having a predetermined size greater than a few micrometres, such as, for example, carbonaceous residues of bones entirely thermolysed during the treatment in the reactor (13). The accepted powder is conveyed to the second combustion chamber (60). On the other hand, the sieving rejects are reinjected into the hopper (4) and then from there into the reactor (13), for better retention of the pollutants.

The second combustion chamber (60) essentially comprises a specific burner (61) for pulverulent carbon. This chamber (60) in its turn feeds a second steam generator (65) similar to (22). The ash (68) obtained in the second combustion chamber (60) is disposed of in a landfill site for final waste.

The second steam generator (65) is used in combination with a unit for the treatment of flue gases (78) intended to recover the pollutants (79) in order for them also to be disposed of in a landfill site for final waste.

The steam produced by the second generator (65) is introduced via a pipe (62), similar to (25), into the unit (1) for the production of meat meal, in particular into the unit for drying the meat carcasses or into the unit intended for drying the meal produced.

In this way, the plant discharges to the external environment only flue gases which are regarded as clean and final waste, since all the energy produced, converted into steam, is reinjected into the plant and is therefore upgraded.

The gaseous fraction introduced into the first combustion chamber (20) and the solid residues introduced into the second combustion chamber (60) are incinerated at a temperature in the region of 850° C. for at least two seconds. The thermal destruction is then complete and makes it possible to optimize the upgrading of the energy content of the meal in the form of steam used on-site, indeed even partly off-site.

The plant in accordance with the invention exhibits numerous advantages with respect to those known to date. Mention may be made of:

operational simplicity;

the use of well-proven facilities;

a modular concept allowing easy and fast installation;

the absence of liquid discharges;

excellent safety and good quality of the thermal treatment, since there is no non-incinerated material;

the fact that, from a waste product, only ash is obtained;

the possibility of carrying out rapid and clean start-ups and shutdowns, with the possibility of placing on standby;

competitive investment costs, low treatment and maintenance costs and the absence of additional costs related to the treatment intended for waste water;

a very good upgrading with regard to energy of the waste, since, per 200 kilos/hour of hospital waste, it is possible to obtain up to 600 kilos/hour of steam at 8 bar or equivalent.

In this way, this plant can be used with success for the treatment of waste of any nature, such as domestic, industrial or hospital waste, treatment plant sludges or other wastes, or indeed even at the site on which this waste is produced, but without resorting to major plants, which it is known are increasingly expensive and problematic to operate under conditions under which the environment is respected.

What is claimed is:

1. Plant for the destruction by thermolysis of meat meal (2) and the combustion of the meal to produce steam that includes:

a unit for the production (1) of meat meal from animal carcasses;

a continuous feed isolation means (5) and a gravity hopper (4) for feeding the meal produced to a reactor;

said reactor for the thermolysis (13) of the meal thus produced;

means (15,16) for recovering, at the top of the reactor (13), the gaseous organic fraction formed during the thermolysis and for introducing this gaseous fraction into a first combustion chamber (20) feeding a first steam generator (22);

means (11) for recovering, at the bottom of the reactor (13), the solid carbonaceous residues formed during the thermolysis and for introducing these solid residues into a second combustion chamber (60) in its turn feeding a second steam generator (65);

said two steam generators (22, 65) in turn feeding energy to the unit for the production (1) of meat meal.

2. A plant for processing waste having an organic fraction and for reusing waste energy in the process, said plant including loading means for introducing waste into a waste treatment system containing a stationary, non-rotatable reactor for thermal dissociation of said waste by thermolysis under a reduced pressure and at a elevated temperature, said system further includes:

means for isolating the waste input and output to the reactor to maintain said reduced pressure in said reactor and to insure said thermolysis reaction is carried out in an atmosphere having a low oxygen content, a gas recovery means in the upper section of said reactor for recovering a gaseous organic fraction from the reactor and introducing the gaseous faction into a first combustion chamber of a first steam generator, a solid recovery means in the lower part of said reactor for recovering solid carbonaceous materials from said reactor and introducing said solid materials into a second combustion chamber of a second steam generator, preheating means for placing exhaust gases form said first and second combustion chambers and steam from said first and second steam generators in heat transfer relation with said waste prior to introducing said waste into said reactor to preheat said waste, and means located between the preheating means and the reactor for adding an agent to said waste for neutralizing of components contained in the waste.

3. The plant of claim 2 that further includes means to mill said waste to bring the waste to a homogenous particle size prior to introducing said waste into said reactor.

4. The plant of claim 2 wherein said reactor operates at a temperature of between 400 g and 1000° C. and a pressure of 5000 and 40,000 pascals in the absence of oxygen.

5. The plant of claim 2 having further means for separating the solid carbonaceous materials recovered from said reactor into a combustible product and a non-combustible product and delivering the combustible product to said second combustion chamber.

6. The plant according to claim 5 that further includes a treatment unit for gases exhausted from said second steam generator for recovering pollutants in said exhaust gases to prevent said pollutants from being discharged into the atmosphere.

* * * * *